(12) United States Patent
Pekarsky et al.

(10) Patent No.: US 9,427,685 B2
(45) Date of Patent: Aug. 30, 2016

(54) SUCTION FILTER MEDIA OVERMOLDED INTEGRALLY WITH TRAY

(71) Applicant: Ford Global Technologies, LLC, Dearborn, MI (US)

(72) Inventors: Lev Pekarsky, West Bloomfield, MI (US); John S. Kozar, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 884 days.

(21) Appl. No.: 13/623,296

(22) Filed: Sep. 20, 2012

(65) Prior Publication Data

US 2014/0076795 A1    Mar. 20, 2014

(51) Int. Cl.
*B01D 35/30* (2006.01)
*B01D 35/027* (2006.01)

(52) U.S. Cl.
CPC .................. *B01D 35/0273* (2013.01)

(58) Field of Classification Search
None
See application file for complete search history.

(56) References Cited

U.S. PATENT DOCUMENTS

| 4,826,598 | A | 5/1989 | Cain |
| 5,049,274 | A | 9/1991 | Leason et al. |
| 5,411,123 | A | 5/1995 | Rej et al. |
| 5,722,508 | A | 3/1998 | Kraus |
| 6,715,459 | B2 | 4/2004 | Rosendahl et al. |
| 7,258,789 | B2 | 8/2007 | Peet et al. |
| 7,261,814 | B2 | 8/2007 | Peet et al. |
| 7,282,140 | B2 | 10/2007 | Boast et al. |
| 7,845,500 | B2 | 12/2010 | Hueppchen et al. |
| 7,875,171 | B2 | 1/2011 | Pekarsky et al. |
| 7,998,347 | B2 | 8/2011 | Pekarsky et al. |
| 8,051,990 | B2 | 11/2011 | Poston et al. |
| 2009/0308803 | A1 | 12/2009 | Beard et al. |
| 2014/0076795 | A1* | 3/2014 | Pekarsky ........... B01D 35/0273 210/348 |

FOREIGN PATENT DOCUMENTS

| CN | 101279165 A | 10/2008 |
| CN | 102218800 A | 10/2011 |

* cited by examiner

*Primary Examiner* — Robert James Popovics
(74) *Attorney, Agent, or Firm* — James Dottavio; MacMillan, Sobanski & Todd, LLC

(57) ABSTRACT

A filter assembly includes a housing including a first cover and a second cover, a grid located in the housing including interconnected ribs and strips, and filter media integral with the grid, including a peripheral width located between the covers.

16 Claims, 5 Drawing Sheets

SUCTION FILTER MEDIA OVERMOLDED INTEGRALLY WITH TRAY

BACKGROUND OF THE INVENTION

1. Field of the Invention

This invention relates generally to a suction filter for automatic transmission fluid incorporating filter media with an overmolded tray.

2. Description of the Prior Art

A transmission suction filter having a single media layer trapped between upper and lower housings provides marginal filtration capacity coupled with functional limitations in efficiency and pressure drop.

To improve filtration efficiency, improved filter elements with bag-type configurations and non-planar elements were developed. However, these designs require greater internal volume and packaging space and are still limited in their functional performance.

Continued improvement in filtration technology has resulted in suction filters with dual media allowing for high media packaging density, high dirt holding capacity, high filtration efficiency, packaging flexibility for irregular shaped housings, and low cost. These designs utilize media configurations that require premium packaging space and add extra components into the filtration system.

A need exists to increase the media packing density while using less packaging space.

SUMMARY OF THE INVENTION

A filter assembly includes a housing including a first cover and a second cover, a grid located in the housing including mutually interconnected ribs and strips, and filter media integral with the grid, including a peripheral width located between the covers.

Combining the rib-strip tray with the filter media, specifically high efficiency media, through an over-molding process reduces the number of components in the filter assembly, allows for a more optimized flow distribution, improves rigidity of the high efficiency filter media, reduces the volume of resin required for the rib-strip ray and reduces the size of the filter assembly.

The filter assembly reduces the cost of the filter, improves the package density of the filter media, improves filter media configurations and increases the filter area.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
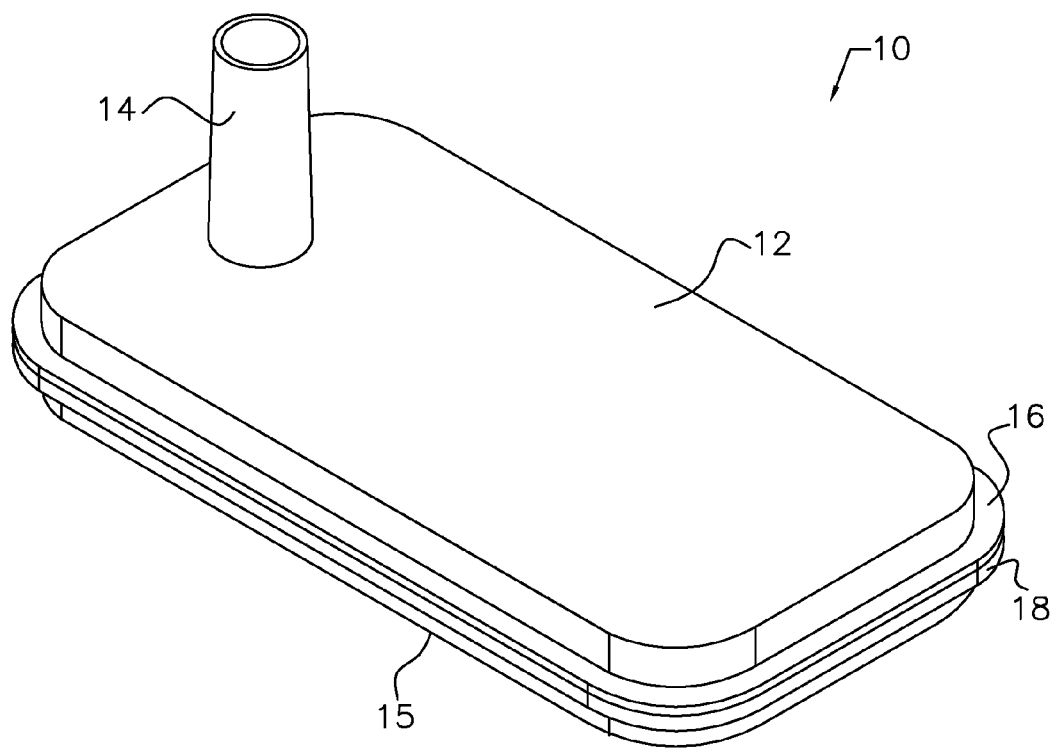
FIG. 1 is a perspective external view showing a filter assembly.

FIGS. 1-5 show a filter assembly 10, which includes an upper cover 12 formed with an exit tube 14, a lower cover 15, mating upper and lower flanges 16, 18 formed on the covers. The covers 12, 15 form a housing containing an overmolded subassembly 20 comprising a filter media 22 and a grid of intersecting longitudinal ribs 24 and lateral strips 30.

Overmolding is an injection molding process wherein one material, such as a thermoplastic elastomer (TPE), is molded integrally with a secondary material, typically a rigid plastic or metal. The overmolded TPE forms a strong bond with secondary material without joints or fasteners. Use of primers or adhesives is not required to achieve a bond between the two materials. In the filter assembly 10 the secondary material is filter media 22.

A hole 26 is formed in the lower cover 15 preferably near the end of the filter 10 that is opposite the end where the exit tube 14 is located. Automatic transmission fluid (ATF) drawn from a fluid sump through hole 26, flows through the filter media 22 and exits the filter assembly 10 though exit tube 14, due to suction produced at the entrance of a hydraulic pump, which communicates with the exit tube 14.

Figure 2:
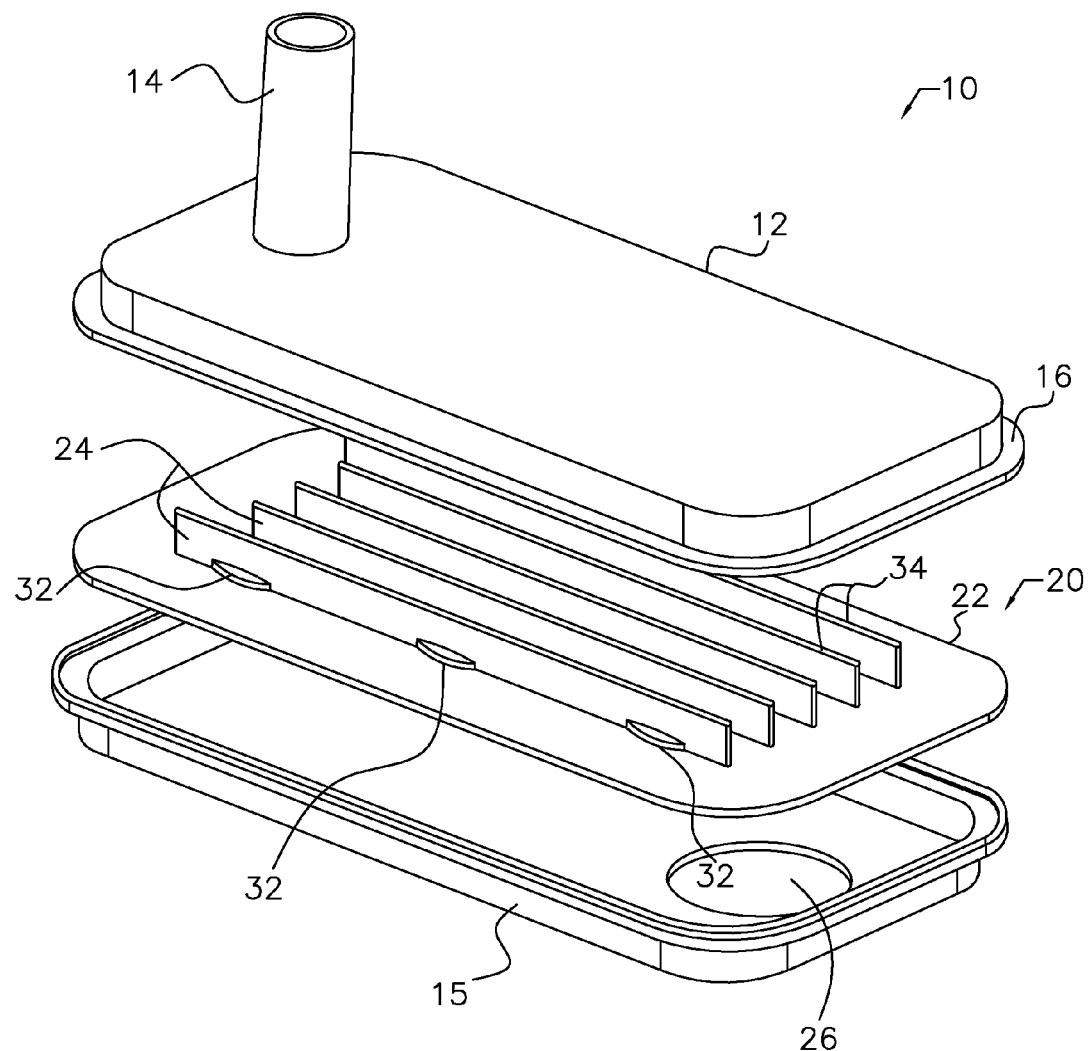
FIG. 2 is perspective exploded view of the filter assembly of FIG. 1.
Figure 3:
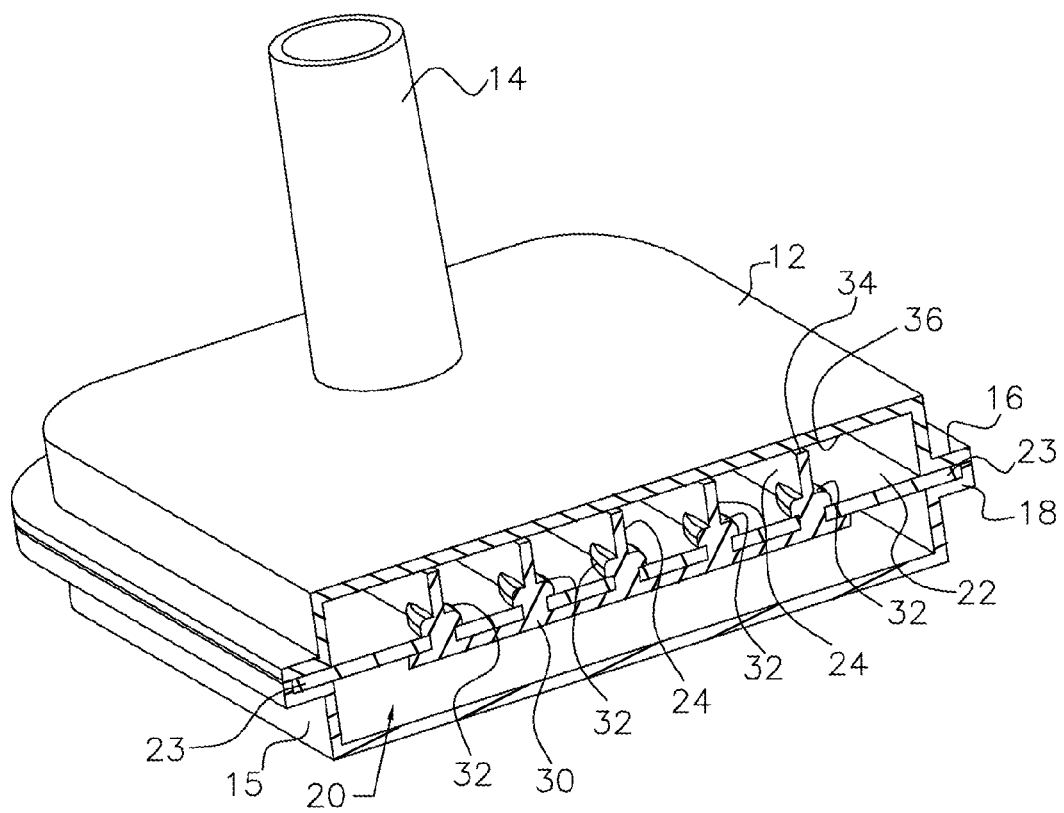
FIG. 3 is a perspective transverse cross sectional view of the filter assembly.
Figure 4:
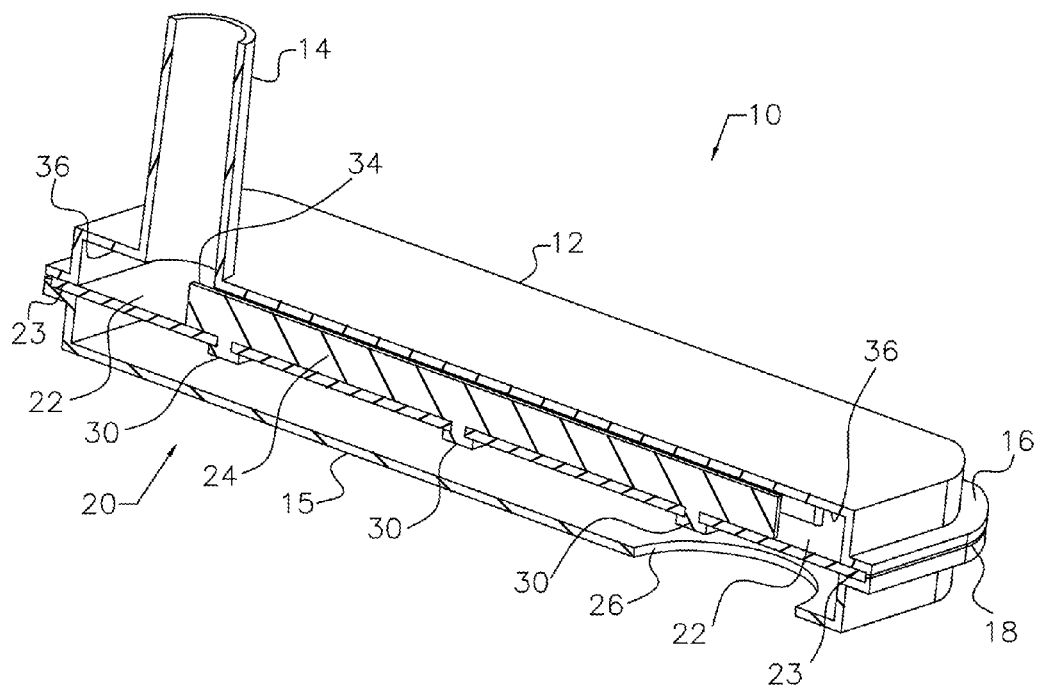
FIG. 4 is a perspective longitudinal cross sectional view of the filter assembly.
Figure 5:
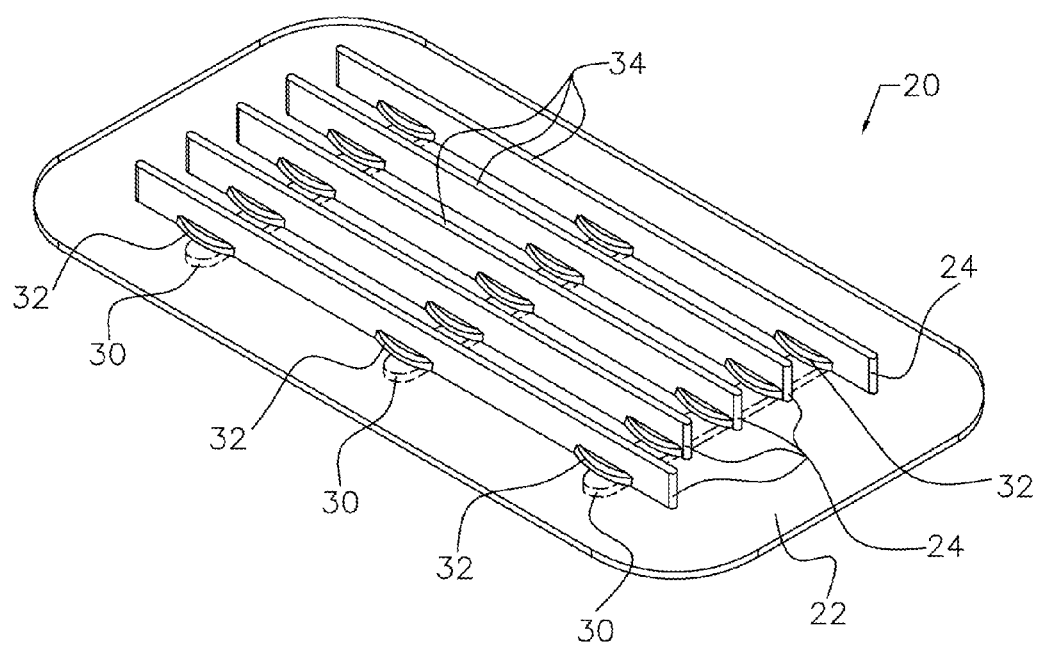
FIG. 5 is a perspective view showing an integral, overmolded subassembly including a tray and filter media.

FIGS. 2-4 show that a width 23 around the periphery of filter media 22 is supported on the lower flange 18 and is overlapped by the upper flange 16.

FIGS. 2-5 show the subassembly 20 is overmolded such that the ribs 24 are interlocked with the filter media 22 by strips 30 and buttons 32, the ribs and strips forming a tray or grid. Located at longitudinally spaced locations along the length of each rib 24 and formed integrally with each rib are strips 30, which extent laterally and interconnect the five ribs forming the tray, which supports the filter media 22. Also located at longitudinally spaced locations along the length of each rib 24 and formed integrally with each rib are buttons 32, each button located at the intersection of each rib 24 and each strip 30. Each button 32 is spaced from the corresponding strip 30 by a vertical gap directed along the depth of the ribs. The filter media 22 is located in the gaps and overmolded with the tray or grid. Each strip 30 is located immediately below the lower surface of the filter media 22 and each button 32 is located immediately above the upper surface of the filter media.

The thickness of the filter media 22 is located in the vertical space between each button 32 and each strip 30. The filter media 22 and the ribs 24 are overmolded together forming a one-piece subassembly 20, which includes no mechanical fasteners or subsequent bonded connections to connect the ribs 24 and the filter media 22 after the subassembly 20 is overmolded.

Differential pressure across the filter media 22, ATF located in the lower cover 12, flanges 16, 18 gripping the edges of the filter media 22, lateral and longitudinal stiffness of the tray formed by the rib 24 and strips 30, and the close tolerance fit between the upper surface 34 of each rib 24 and the lower surface 36 of the upper cover 12 supports and holds the filter media 22 in a substantially level plane in the assembly 10.

Combining the rib-strip tray with the filter media 22, specifically high efficiency media, through an over-molding process reduces the number of components in the filter assembly 10, allows for a more optimized flow distribution, improves rigidity of the high efficiency filter media, reduces the volume of resin required for the rib-strip ray and reduces the size of the filter assembly 10.

In accordance with the provisions of the patent statutes, the preferred embodiment has been described. However, it should be noted that the alternate embodiments can be practiced otherwise than as specifically illustrated and described.

The invention claimed is:

1. A filter assembly, comprising:
a housing including a first cover, having an inlet, secured to a second cover, having an outlet;
a grid within the housing including mutually interconnected ribs and strips;
filter media integral with the grid, including a periphery secured to and contacting the housing, the ribs on one of a fluid filtered and a fluid unfiltered side of the filter, and the strips on the opposite side of the filter.

2. The filter assembly of claim 1, wherein:
each rib is spaced from an adjacent rib and extends in a first direction;
each strip is spaced from an adjacent strip and extends substantially perpendicular to each rib.

3. The filter assembly of claim 1, wherein:
each rib is spaced from an adjacent rib and extends in a first direction; and
further comprising buttons, each button is located at one of the strips is separated from said one of the strips by a gap;
the filter media is located in the gaps.

4. The filter assembly of claim 1, further comprising:
buttons, each button located at one of the interconnections formed by one of the ribs and one of the strips and separated from said one of the strips by a gap; and
wherein the filter media is located in the gaps and overmolded with grid.

5. The filter assembly of claim 4, wherein:
each strip is located adjacent a lower surface of the filter media and each button is located adjacent an upper surface of the filter media.

6. A filter assembly, comprising:
a housing having an inlet and an outlet; and
a subassembly in the housing, including a grid of mutually spaced ribs and mutually spaced strips secured to ribs at interconnections defining gaps, and a filter media overmolded integrally with the grid, secured in the gaps, the ribs on one of a fluid filtered and a fluid unfiltered side of the filter and the strips on the opposite side of the filter.

7. The filter assembly of claim 6, wherein:
the housing includes a first cover and a second cover; and
filter media includes a peripheral width secured to and contacting the covers.

8. The filter assembly of claim 6, wherein:
each rib is spaced from an adjacent rib and extends in a first direction;
each strip is spaced from an adjacent strip and extends substantially perpendicular to each rib.

9. The filter assembly of claim 6, wherein:
each rib is spaced from an adjacent rib, extends in a first direction; and
further comprising buttons, each button located at one of the interconnections and separated from said one of the strips, said separation forming one of the gaps.

10. The filter assembly of claim 6, further comprising:
buttons, each button located at one of the interconnections and separated from one of the strips by one of the gaps.

11. The filter assembly of claim 10, wherein:
each strip is located adjacent a lower surface of the filter media and each button is located adjacent an upper surface of the filter media.

12. A filter assembly, comprising:
a housing including a first cover, having an inlet, secured to a second cover, having an outlet;
a subassembly within the housing, including a grid of mutually spaced ribs and mutually spaced strips, each strip secured to the ribs at interconnections defining gaps, and a filter media, having fluid filtered and unfiltered sides, overmolded integrally with the grid, located in the gaps, and including a periphery secured to and contacting the housing.

13. The filter assembly of claim 12, wherein:
each rib is spaced from an adjacent rib and extends in a first direction;
each strip is spaced from an adjacent strip and extends substantially perpendicular to each rib.

14. The filter assembly of claim 12, wherein:
each rib is spaced from an adjacent rib and extends in a first direction; and
further comprising buttons, each button located at one of the strips and separated from said one of the strips by one of the gaps.

15. The filter assembly of claim 12, further comprising:
buttons, each button located at one of the interconnections and separated from said one of the strips by one of the gaps.

16. The filter assembly of claim 15, wherein:
each strip is located adjacent a lower surface of the filter media and each button is located adjacent an upper surface of the filter media.

* * * * *